Sept. 30, 1947.  V. A. HOOVER  2,428,162

END BELL FOR ELECTRICAL MACHINES

Filed Nov. 6, 1943  4 Sheets-Sheet 1

Inventor

VAINO A. HOOVER

By Samuel Scrivener Jr.

Attorney

Sept. 30, 1947.    V. A. HOOVER    2,428,162
END BELL FOR ELECTRICAL MACHINES
Filed Nov. 6, 1943    4 Sheets-Sheet 2
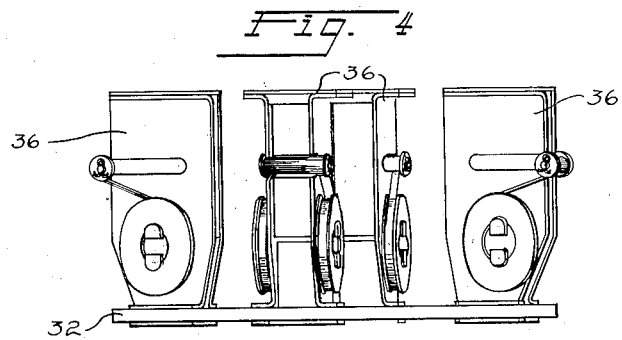
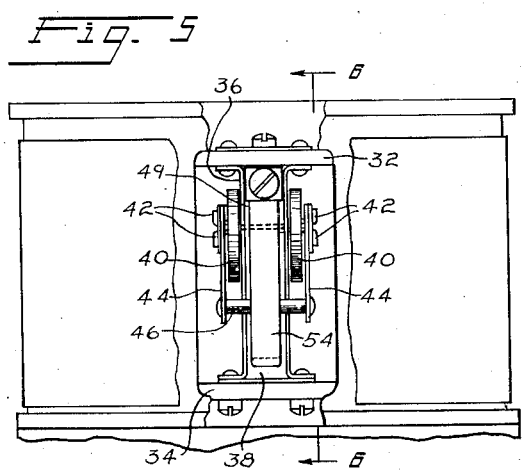
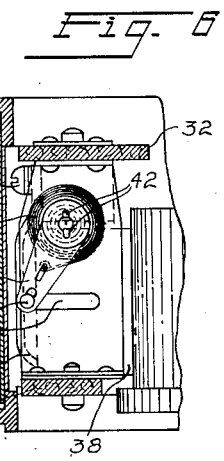
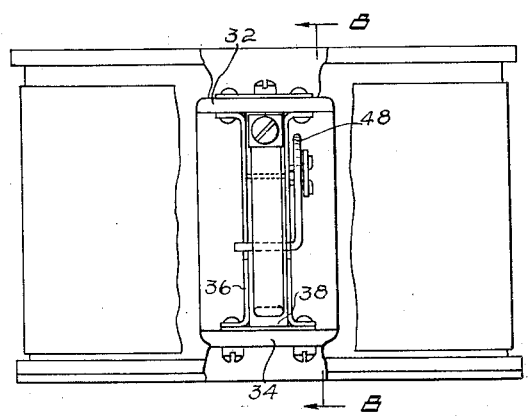
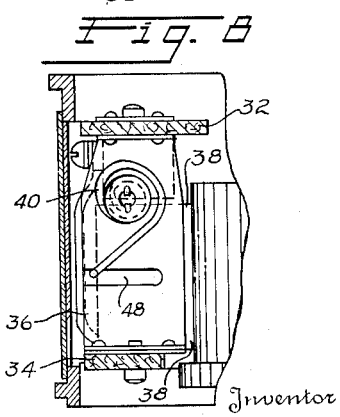
Inventor
VAINO A. HOOVER

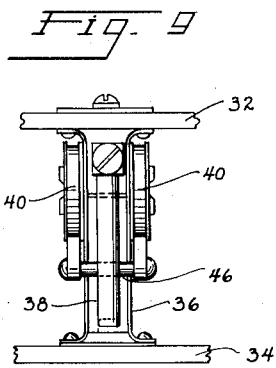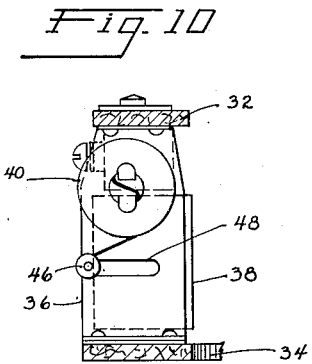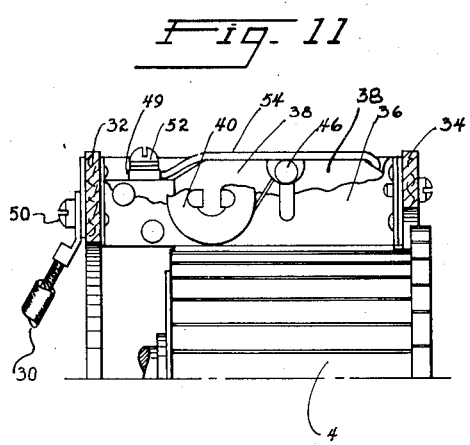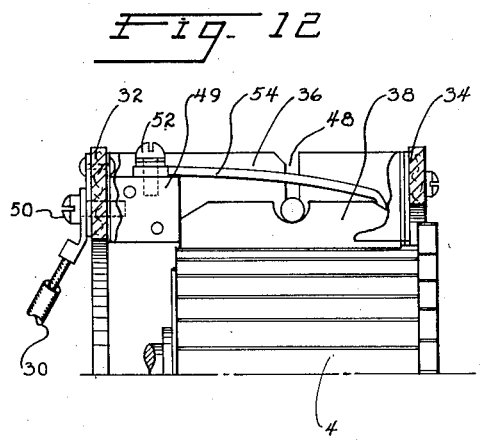

Sept. 30, 1947.  V. A. HOOVER  2,428,162
END BELL FOR ELECTRICAL MACHINES
Filed Nov. 6, 1943  4 Sheets-Sheet 4

Inventor
VAINO A. HOOVER
By Samuel Scrivener Jr.
Attorney

Patented Sept. 30, 1947

2,428,162

UNITED STATES PATENT OFFICE 2,428,162

END BELL FOR ELECTRICAL MACHINES

Vaino A. Hoover, Los Angeles, Calif., assignor to Electrical Engineering and Manufacturing Corporation, Los Angeles, Calif., a corporation of California Application November 6, 1943, Serial No. 509,297

7 Claims. (Cl. 171—324)

1

This invention relates to electrical machines of the type having a rotating commutator to or from which electrical energy must be delivered or taken by brushes. Motors and generators are example of such machines and, without implying any limitation whatsoever, the invention will be described in this application as applied to an electric motor.

It is very desirable in motor operation to secure maximum brush contact area, in order to improve contact between the brushes and the commutator and reduce voltage drop and current density and to increase to a maximum the life of the brushes. It has been found that maximum brush contact area may be achieved by increasing the diameter of the commutator to a maximum and that as a practical matter the permissible maximum commutator diameter is the diameter of the armature-receiving bore in the stator. Every increase in the diameter of the commutator of course reduces the space surrounding the commutator which is available for the brushes, it being assumed that the diameter of the casing surrounding the commutator is not increased.

It has been a principal object of this invention to provide brush supporting and moving means which are so constructed and arranged as to permit maximum commutator diameter, and to provide means for making the most complete utilization of the space between the periphery of the commutator and the surrounding casing. Another object has been to provide a unitary assembly of all of the brush boxes of the machine and which may be inserted into or removed from the machine as a unit. Another object has been to provide a brush supporting and enclosing means which will permit easy and quick removal of any one or all of the brushes without disturbing the other brushes or brush boxes. A further object has been to provide new and improved means for urging and moving the brushes toward the commutator, which means will exert a substantially constant force on the brushes over the entire range of movement thereof while wearing, and which means will permit maximum utilization of the radial space available for the brushes, whereby brushes of maximum radial length may be used. A still further object has been to provide a brush mounting and operating structure in which only a minimum of energy will be required to move the means which conduct current to the brush as the brush moves in wearing. While the invention is not limited in any way to such motors, the various features and improvements provided by the invention are particularly

2 useful with respect to motors having space or weight limitations, as such features permit increased power output with minimum weight and within minimum space.

All of these objects and others have been achieved by the present invention, embodiments of which are disclosed in the following specification and the accompanying drawings. It will be understood, however, that such specification and drawings are only illustrative of the invention and impose no limitation thereon not imposed by the appended claims.

Referring to the drawings, in which similar reference numerals refer to like parts, Fig. 1 is an end view of a motor showing parts and assemblies according to the invention, part of one of the supporting rings being broken away to show the end bell structure more clearly;

Fig. 4 is a perspective view of a unitary brush box assembly according to the invention;

Figs. 5 and 6 are, respectively, top plan and side views of a brush supporting and operating device according to the invention;

Figs. 7 and 8 are, respectively, top plan and side views of a brush supporting device including a second form of device for urging the brush toward the commutator.

Figs. 9 and 10 are, respectively, top plan and side views of a brush supporting device including a third form of brush operator;

Figs. 11 and 12 are side views of a brush mounting, partly broken away, showing means according to the invention for attaching an electric conductor to the brush, such views being illustrative, respectively, of positions of the parts before and after considerable wearing of the brush;

Figure 1:
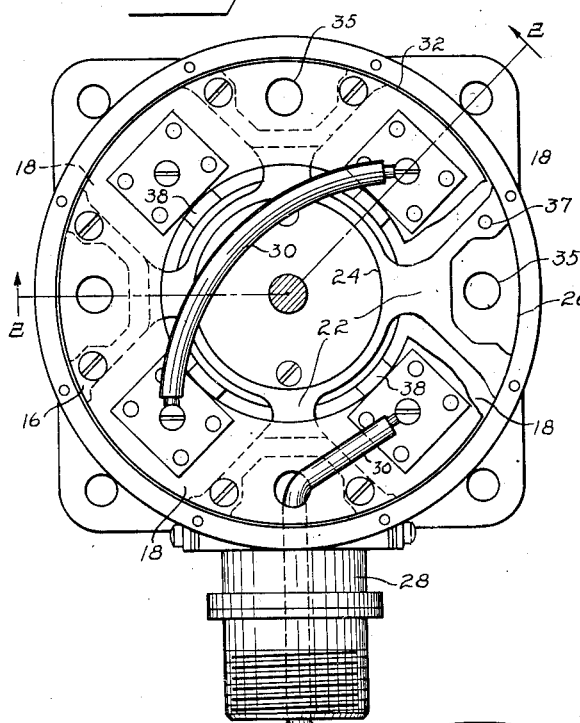
Figure 2:
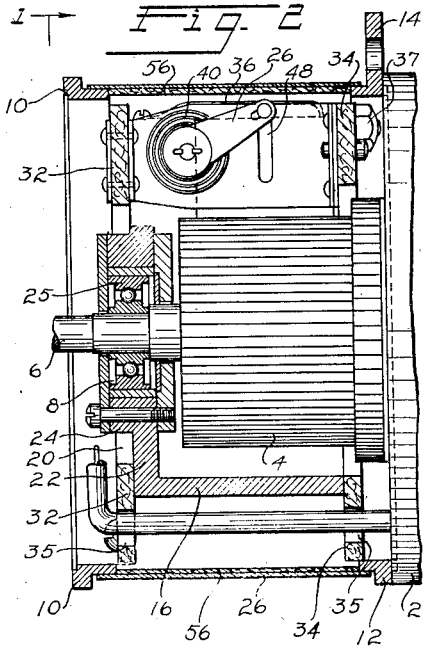
Fig. 2 is a view, partly in section, taken on line 2—2 of Fig. 1 and showing the commutator end of a motor having a brush-supporting end bell according to the invention associated therewith.

In Figs. 1 and 2 of the drawing there is illustrated the commutator end of an electrical machine of the type to which my invention relates. This machine comprises a stator 2, within the central opening of which an armature (not shown) is rotatably mounted, a commutator 4 and an armature shaft extension 6 on the end of which a fan (not shown) may be mounted for the purpose of driving cooling air through the motor parts.

Figure 3:
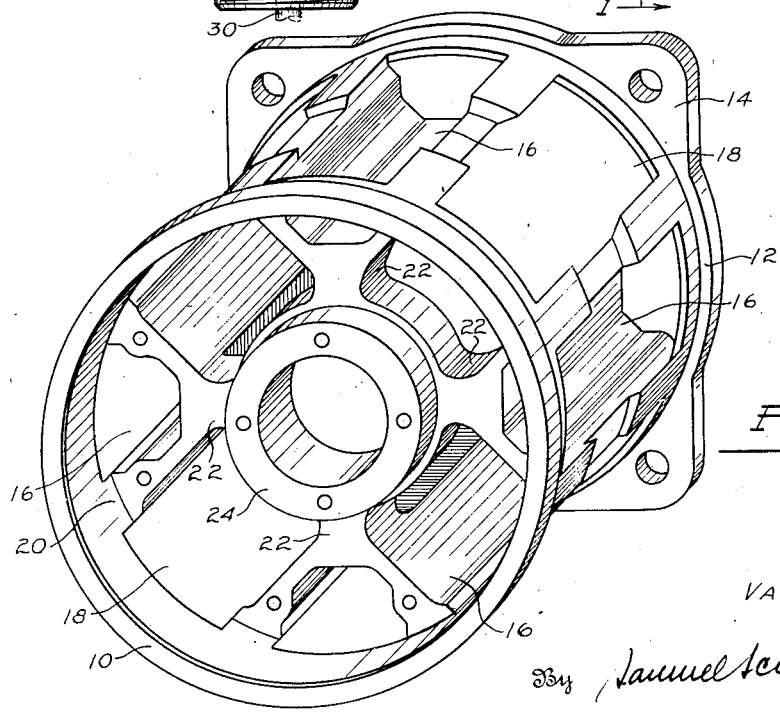
Fig. 3 is a perspective view of an end bell according to the invention.

Means are provided by the invention which support current-conducting brushes in spaced relation about the commutator, provide wiring supporting means, and support an enclosing cover for the armature and brush assembly, such means being known as an end bell and being so referred to herein. The end bell comprises two axially-aligned rings 10, 12 which are connected by four members 16 of channel-shaped cross-section which are spaced at 90° intervals about the rings and which are connected to the rings at the upper ends of the side walls thereof. These channel members are of such circumferential extent that openings 18, having functions and purposes to be described hereinafter, are left between adjacent members. The channel members are of such radial extent that, when the end bell is in assembled relation with the commutator, the bottoms of the channel members are closely adjacent the outer periphery of the commutator. The axial extent of the channel members is such that their end faces are spaced inwardly of the adjacent inner faces of the rings leaving spaces 20, as shown in Figs. 2 and 3, for a purpose to be explained hereinafter. Extending radially inwardly from the bottom of each channel adjacent the outer ring 10 is an arm 22 which is connected at its inner end to a ring 24 which is concentric with ring 10 and spaced radially inwardly thereof. The entire described device is preferably made of one piece and is adapted to be attached, as by ears 14 which form part of the inner ring 12, to the motor field frame 2 and to extend therefrom in such position that it surrounds the commutator and preferably extends beyond the outer end thereof, the inner ring 24 surrounding and forming a support for a bearing 8 which supports the commutator end of armature shaft 6. A cover band 26 surrounds the end bell between the end rings, the ends thereof being attached to a connector plug 28 which communicates with one of the channels 16 and through which wiring 30 may be led into the end bell.

Means are provided by the invention for supporting a brush receiving box within each of the radially and axially open spaces 18 which are located between the adjacent channels 16 of the end bell, in such a manner that all of the brush boxes may be inserted into the end bell or removed therefrom as a unit. Such means comprise a ring 32 which is formed of insulating material having high mechanical strength, such as Bakelite, which has substantial radial dimension, and to a flat side of which, as shown in Fig. 4, there are permanently attached a plurality of brush boxes 36, the number of which is equal to the number of open spaces 18 of the end bell. Each brush box is preferably rectangular in cross-section and has opposite side walls and end walls and open inner and outer radial sides whereby a brush 38 disposed therein may be freely moved in a radial direction toward and away from the commutator. The ring 32, with the attached brush boxes, is adapted to be assembled with the end bell in such a manner that the ring is received within the space 20 adjacent the ring 10 and the brush boxes are respectively received within the open spaces 18 of the end bell. The end walls of the brush boxes which are not attached to ring 32 are attached by screws to a second insulating ring 34, after which the rings 32, 34 are rigidly attached to the end bell by bolts 37 which pass through the side walls of the channel-shaped members 16. It will be apparent that the entire assembly of ring 32 and the brush boxes and brushes attached thereto may be removed from the end bell simply by removal of the bolts 37 and the screws holding the brush boxes to the ring 34. Further, by removal of the cover band 26 the open spaces 18 of the end bell are uncovered and the brush boxes exposed, whereby any one or all of the brushes may be removed from the brush boxes.

It will be seen that when the parts are assembled in the manner described, the rings 32, 34 will close the ends of the channel-shaped compartments 16 and the open spaces 18 and the brush boxes will be disposed in the open spaces 18. As stated hereinbefore, the ring 32 is positioned axially inwardly of the outer edge of ring 10 and a space is therefore provided within ring 10 and outside of ring 32 which may be utilized for the wiring which must be associated with the brushes. As shown in Fig. 1 wiring 30 may be brought into this space through the connecter plug 28 and one of the channel-shaped passages 16 while additional connections 30 between brushes may also be disposed within this space. As shown in Fig. 2 other wiring may be brought into this space from the stator winding through one of the passages 16. In all cases, openings 35 must be formed in the rings 32, 34 in order to permit the wiring to be passed therethrough. A cover plate (not shown) normally closes the open commutator end of the motor and it will be seen that by removing this cover plate all necessary winding of the motor is readily accessible.

New and improved means are provided for constantly urging and moving each brush toward the commutator. Such means comprise two flat spiral torsion-springs 40 which are respectively attached to the opposite side walls of each brush box exteriorly thereof, the inner end of each such spring being attached to lugs 42 which are punched and bent out of each side wall of each brush box, and the outer end of each spring being connected to an arm 44 which extends radially of the attached spring and is pivotally supported on the lugs 42 which support the attached spring. The outer ends of the two arms 44 of each brush box assembly are connected by a cross-bar 46 which engages the radially outer face of the brush therein, whereby the brush is constantly urged by the springs in the direction of the commutator, slots 48 being provided in the side walls of each box to accommodate the cross-bar as it moves relatively to the sidewalls as the brush wears.

A modified form of brush moving means is disclosed in Figs. 7 and 8 of the drawings. In this embodiment only one flat spiral spring 48 is provided and an integral extension of the free or outer end thereof is extended through a slot in a side wall of the brush box to engage the radially outer edge of the brush.

In a further embodiment of brush operating means according to the invention, which is disclosed in Figs. 9 and 10, the arms 44 of Figs. 5 and 6 are eliminated and the free ends of the torsion springs 40 are connected directly to the cross-bar 46.

The initial torsional stress given to the springs and the attachment of the inner end of each of them to a side wall of the brush box permits a very small angular movement of each spring between the most extended position of each brush, as when new, and the most depressed position, as when completely worn. Thus, if the initial force on the brush corresponds to a 360° windup of each spring, and if each spring must unwind through 30° in order to accommodate maximum brush wear, the final spring torsion will correspond to 330° of windup. Thus, the final pressure on the brush will be approximately 92% of the original pressure and the brush pressure will therefore be substantially constant throughout the entire range of movement thereof. It will also be seen that by utilizing torsion springs as brush-operating means and by placing these on the sides of the brush box and within the space outside of the commutator, it is possible to increase the length of the brushes to the maximum radial distance between the commutator and the inner surface of the housing 2.

Means, having to do with the wiring which conducts electric energy to the brush system, are also provided by the invention for facilitating the maximum usage of available space between the commutator and the cover band 26 and for reducing the spring effort required to move the wiring as the brushes wear. Such means are particularly disclosed in Figs. 11 and 12 of the drawings, in which are shown the commutator 4, supporting rings 32, 34, brush 38, torsion spring 40 and cross-bar 46. It will be observed that in Fig. 11 the brush is in its extended, or new, position while in Fig. 12 it is in a depressed, or worn, position. Electric energy is conducted to the brush through lead 30, connecting screw 50, terminal block 49, shunt connecting screw 52 and shunt 54. In accordance with the invention the terminal block 52 is positioned adjacent that end of the brush which is adjacent ring 32 and the shunt is elongated and extends from this terminal block to the other end of the brush, passing along the upper or radially outer surface thereof. The shunt is preferably made of relatively flexible basket-weave metallic material and the end thereof remote from the terminal 52 is connected to the brush as by tamping. It will be apparent, particularly by comparison of Figs. 11 and 12, that as the brush wears and is moved radially inwardly in the brush box very little angular movement of the shunt will take place and very little effort of the torsion spring will be required to effect such angular movement, whereby substantially all of the power of the spring will be applied to the brush face at the commutator. It will also be apparent that the provision of an elongated, flat shunt disposed along the outer surface of the brush will reduce the overall radial dimension of the brush and shunt to a minimum. The inside surface of the cover 26 may be provided with an insulating strip 56 of glass fabric or other suitable material for the purpose of insulating the brush shunts from the cover.

Figure 13:
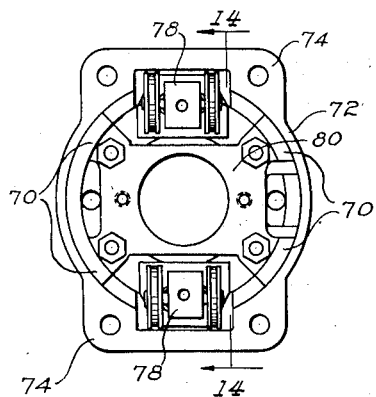
Figs. 13 and 14 are front and side views respectively, of a modified form of an end bell according to the invention.
Figure 14:
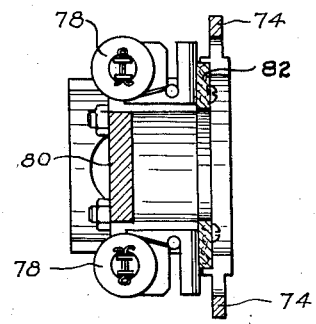
Figure 15:
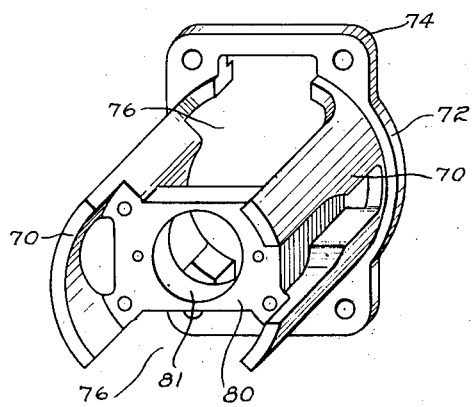
Fig. 15 is a perspective view of the device shown in Figs. 13 and 14, the supporting rings and brush boxes being removed.

A modified form of the invention, in which the outer ring 10 is eliminated, is illustrated in Figs. 13 to 15. In this embodiment two channel-shaped members 70 are extended axially from the main supporting ring 72 which is adapted to be attached to the stator frame by ears 74. These members are preferably so positioned that they are on opposite sides of the ring, leaving two diametrically-opposed open spaces 76 between them within which brush boxes 78 are adapted to be mounted. An armature shaft bearing support 80 is attached to the outer ends of members 70 and has an opening 81 therein which is concentric with ring 72. A brush supporting ring 82 is disposed within ring 72 and has substantial radial dimension in order that it may provide a support for one end of each brush box. It will be seen that this embodiment of my invention, as with other possible embodiments and modifications thereof, does not differ in general spirit from that previously described.

It is believed that the mode of assembly and operation of my invention will be apparent to those skilled in the art and no further description thereof is believed to be necessary. It will be seen, however, that the end bell structure, including the brushes and their mounting, may be made up as a single assembly which may be quickly connected to the stator frame or as easily and quickly removed therefrom. Further, all of the brush boxes and the brushes therein may be removed as a unit merely by removing bolts 37 and ring 32, while any one or all of the brushes may be removed by removing the cover band 26, thereby uncovering the open spaces 18 within which the brush boxes are mounted. Still further, the structure and arrangement of the brush-moving springs and the current-conducting shunt permit maximum utilization of the radial space between the commutator and the enclosing cover band whereby brushes of maximum length may be used.

All of the foregoing and other advantages are produced by this invention. While I have described and illustrated various features and embodiments of my invention it will be apparent to those skilled in the art that other embodiments or modification may be made, all of which may be done without departing in any way from the spirit or scope of the invention, for the limits of which reference must be had to the appended claims.

I claim:

1. As a new article of manufacture, a brush-supporting device for electrical machines, comprising two spaced, coaxial rings, a plurality of circumferentially-spaced members connected to said rings and defining spaces therebetween for the reception of brush-receiving boxes, two annular members connected to said circumferentially-spaced members and being respectively positioned adjacent said rings, and a plurality of brush-receiving boxes carried by said annular members and each positioned within one of said spaces.

2. A brush holding and moving device comprising a body portion having open radial outer and inner ends, spaced side walls and spaced end walls, at least one of the side walls having an elongated slot therein extending from the radial outer end toward the radial inner end thereof, a brush supported in the body portion for movement in the direction of the radial inner end thereof, and means for constantly urging the brush in the direction of the inner end of the holder comprising a flat spiral spring connected at its inner end to a side wall of the holder and being exterior, parallel and closely adjacent thereto and having a free end part extending across the outer edge of the brush and through the slot in the side wall of the holder.

3. A brush holding and moving device comprising a body portion having open radial outer and inner ends, spaced side walls and spaced end walls, a brush supported in the body portion for movement toward the radial inner end, and means for constantly urging the brush toward the inner end comprising two flat spiral torsion springs each of which is connected by its inner end to one of the side walls of the holder and each of which is exterior, parallel and closely adjacent to the side wall to which it is attached, and a cross-bar connecting the free ends of the springs and extending across the holder and engaging the radial outer end of the brush.

4. A brush holding and moving device comprising a body portion having open radial outer and inner ends, spaced side walls and spaced end walls, the side walls having parallel, aligned and elongated slots therein extending from the radial outer ends thereof toward the radial inner ends thereof, a brush supported in the body portion for movement toward the radial inner end thereof, and means for constantly urging the brush toward the radial inner end comprising two flat spiral springs each of which is connected by its inner end to one of the side walls of the holder and each of which is exterior, parallel and closely adjacent to the side wall to which it is attached, and a cross-bar connecting the free ends of the springs and extending through the slots in the side walls of the holder and engaging the radial outer end of the brush.

5. As a new article of manufacture, an integral brush-supporting device for electrical machines, comprising two spaced, co-axial rings, a plurality of channel-shaped members connecting said rings with the channels opening outwardly to receive wiring, said members being circumferentially spaced about said rings to define spaces therebetween for the reception of brush-receiving boxes.

6. As a new article of manufacture, an integral brush-supporting device for electrical machines, comprising two spaced, co-axial rings, a plurality of channel-shaped members connecting said rings with the channels opening outwardly to receive wiring, said members being circumferentially spaced about said rings to define spaces therebetween for the reception of brush-receiving boxes, a bearing supporting ring co-axial with and of smaller diameter than said spaced rings, and an arm extending radially inwardly from each of said channel-shaped members and connected to said bearing supporting ring.

7. As a new article of manufacture, a brush and bearing supporting device for electrical machines, comprising an annular supporting member adapted to be attached to the frame of the machine surrounding the commutator thereof, two diametrically-opposed channel-shaped members extending in the same direction from said annular member and having spaces therebetween within which brush boxes are adapted to be supported, and a bearing support member connected to and supported by said channel-shaped members interiorly thereof and in spaced, parallel relation to said annular member and having an opening therein adapted to receive and support the end of the armature shaft of an electrical machine.

VAINO A. HOOVER.

REFERENCES CITED

The following references are of record in the file of this patent:

UNITED STATES PATENTS

| Number | Name | Date |
|---|---|---|
| 613,864 | Moore | Nov. 8, 1898 |
| 705,055 | Erben | July 22, 1902 |
| 1,168,021 | Mills | Jan. 11, 1916 |
| 1,292,660 | Starker | Jan. 28, 1919 |
| 1,342,583 | Borger | Jan. 8, 1920 |
| 1,412,144 | Steiner | Apr. 11, 1922 |
| 1,808,747 | Apple | June 9, 1931 |
| 1,934,521 | Bollinger | Nov. 7, 1933 |
| 2,309,316 | Hollander | Jan. 26, 1943 |
| 2,379,176 | Mulheim | June 26, 1945 |

FOREIGN PATENTS

| Number | Country | Date |
|---|---|---|
| 112,008 | Austria | Jan. 10, 1929 |